Patented May 23, 1944

2,349,290

UNITED STATES PATENT OFFICE 2,349,290

METHOD OF IMPROVING THE ADHESION OF NYLON TO RUBBER

Dwight L. Loughborough, Akron, Ohio, assignor to The B. F. Goodrich Company, New York, N. Y., a corporation of New York No Drawing. Application November 1, 1941, Serial No. 417,573

12 Claims. (Cl. 117—7)

This invention relates to a method of improving the adhesion of fibrous structures comprising nylon fibers, particularly cords comprising nylon yarns, to rubber, and to the resulting composite product comprising nylon fibers and rubber in adhering relation.

Because of its superior tensile strength, elasticity, and resistance to flexing, nylon fibers have been enjoying an increasing use as reinforcing members for rubber structures. This is especially true in such composite rubber structures as tires, transmission belts, conveyor belts, and the like where the life of the article is to a large degree dependent upon the reinforcing action contributed by the fibrous structures incorporated therein. One of the main disadvantages to the use of nylon, however, is the fact that nylon has only about 0.4 the adhesion to rubber that cotton has and thus the nylon cords or fabric tend to pull loose more readily from the rubber. It is an object of this invention to provide a method of increasing the adhesion of nylon fibrous structures, whether in the form of yarns, cords, fabric, or the like, to rubber so that the adhesion is markedly improved in the final product.

In practicing the method of this invention I provide a fibrous structure comprising either wholly or part nylon. This fibrous structure is treated first with a nylon solvent such as phenol, cresol, resorcinol, or xylenol and then with an aqueous dispersion of a rubber material, preferably natural rubber latex, to give the fibrous structure a coating of a rubber material. The structure is dried, preferably under tension, then associated with a vulcanizable rubber composition, and the rubber is vulcanized to make a composite rubber-fiber product. The fibrous structures comprising nylon treated with the solvent are said to have been solvenized by the action of the solvent on the nylon fibers. In one embodiment of this invention nylon cords are immersed in a cresol solution consisting of 10% by weight of cresol in ethyl alcohol, the excess solution is removed as by squeezing, the cords are immersed in a normal latex and then the treated cords are dried under tension sufficient to maintain them in their original length. After drying, the cords may then be incorporated in a rubber composition in a manner similar to the way cotton cords are incorporated in making tires, belts, and the like. It has been found that by the method of this invention it is possible to increase the adhesion of nylon cords to rubber by about 400% over the untreated nylon cords.

In this invention any nylon solvent may be used in addition to those already mentioned and any fibrous structure may be treated so long as it contains nylon fibers. The solvent may be used to treat the fibrous structures prior to treating them with the aqueous dispersion of a rubber material, as specified hereinabove, or the solvent may be added to the aqueous dispersion and the nylon fibers treated in a single dip process. In this latter case, the solvent should be added in an amount just short of that amount which would cause coagulation of the aqueous dispersion of rubber material. This is, of course, determined by the kind and concentration of solvent employed.

The term "aqueous dispersion of a rubber material," as used in the claims, is intended to include all naturally occurring and artificially prepared dispersions of natural and/or synthetic rubber in aqueous media. The term nylon used throughout the specification and claims is now universally recognized as a descriptive name for a new synthetic polymer. These polymers are the superpolyamides, of which polyhexamethylene adipamide is the most important member. It is not a trade name or trade-mark and is open to the free use by anyone.

Having disclosed my invention it is my desire to claim it broadly, not limited as to any particular type of fibrous structure containing nylon or to any particular nylon solvent or to any method of applying the solvent and the aqueous dispersion of a rubber material, all within the spirit and scope of the appended claims.

I claim:

1. In a method of making a composite product in which nylon fibers are associated with a vulcanizable but unvulcanized solid rubber composition and the rubber then subjected to vulcanization, the process which comprises the additional steps of pre-treating the nylon fibers with a nylon solvent and also with an aqueous dispersion of rubber material before the nylon fibers are associated with said solid rubber composition.

2. In a method of making a composite product in which nylon fibers are associated with a vulcanizable but unvulcanized solid rubber composition and the rubber then subjected to vulcanization, the process which comprises the additional steps of pre-treating the nylon fibers with a nylon solvent and coating the treated nylon fibers with an aqueous dispersion of a rubber material before associating the coated fibers with the solid rubber composition.

3. In a method of making a composite product in which a fibrous structure comprising nylon fibers is associated with a vulcanizable but unvulcanized solid rubber composition and the rubber then subjected to vulcanization, the process which comprises the additional steps of pre-treating the fibrous structure with a nylon solvent, immersing the treated fibrous structure in an aqueous dispersion of a rubber material, and drying the resulting coating before associating the treated fibers with the solid rubber composition.

4. In a method of making a composite product in which cord comprising nylon yarn is associated with a vulcanizable but unvulcanized solid rubber composition and the rubber then subjected to vulcanization, the process which comprises the additional steps of pre-treating the cord with a nylon solvent, immersing the treated cord in an aqueous dispersion of rubber material, and drying the resulting coating before associating the coated cord with the solid rubber composition.

5. In a method of making a composite product in which cord comprising nylon yarn is associated with a vulcanizable but unvulcanized solid rubber composition and the rubber then subjected to vulcanization, the process which comprises the additional steps of treating the cord with a nylon solvent, immersing the treated cord in an aqueous dispersion of a rubber material, and drying the coated cord under tension before associating the coated cord with the solid rubber composition.

6. In a method of making a composite product in which cord comprising nylon yarn is associated with a vulcanizable but unvulcanized solid rubber composition and the rubber then subjected to vulcanization, the process which comprises the additional steps of treating the cord with a nylon solvent, immersing the treated cord in an aqueous dispersion of a rubber material, and drying the coated cord under a tension sufficient to maintain the cord in substantially its original length, all before associating the coated cord with the solid rubber composition.

7. In a method of making a composite product in which cord comprising nylon yarn is associated with a vulcanizable but unvulcanized solid rubber composition and the rubber then subjected to vulcanization, the process which comprises the additional steps of treating the cord with a nylon solvent, immersing the treated cord in latex, and drying the latex coated cord under tension before associating the coated cord with the solid rubber composition.

8. In a method for making a composite product in which cord comprising nylon yarn is associated with a vulcanizable but unvulcanized solid rubber composition and the rubber then subjected to vulcanization, the process which comprises the additional steps of treating the cord with a nylon solvent, immersing the treated cord in latex, and drying the latex coated cord under a tension sufficient to maintain the cord in substantially its original length, all before associating the coated cord with the solid rubber composition.

9. In a composite product comprising a rubber composition and a fibrous structure in adhering relation therewith, the assembly comprising solvenized nylon fibers, a coating of rubber deposited thereon from an aqueous dispersion of a rubber material, and a layer of a different rubber composition contiguous with the coating of deposited rubber.

10. In a composite product comprising a rubber composition and a cord in adhering relation therewith, the assembly including a cord comprising solvenized nylon fibers, a coating of rubber deposited thereon from an aqueous dispersion of a rubber material, and a layer of a different rubber composition contiguous with the coating of deposited rubber.

11. In a composite product comprising a rubber composition and a cord in adhering relation therewith, the assembly including a cord comprising solvenized nylon fibers, a coating of latex rubber deposited thereon, and a layer of a different rubber composition contiguous with the latex rubber.

12. In a composite product comprising a vulcanized rubber composition and a fibrous structure in adhering relation therewith, the assembly comprising solvenized nylon fibers, a coating of rubber deposited thereon from an aqueous dispersion of a rubber material, and a layer of a different rubber composition in a vulcanized condition contiguous with the coating of deposited rubber.

DWIGHT L. LOUGHBOROUGH.